(12) United States Patent
Tucker

(10) Patent No.: US 9,250,671 B2
(45) Date of Patent: Feb. 2, 2016

(54) CRYPTOGRAPHIC LOGIC CIRCUIT WITH RESISTANCE TO DIFFERENTIAL POWER ANALYSIS

(75) Inventor: James L. Tucker, Clearwater, FL (US)

(73) Assignee: Honeywell International Inc., Morris Plains, NJ (US)

( * ) Notice: Subject to any disclaimer, the term of this patent is extended or adjusted under 35 U.S.C. 154(b) by 544 days.

(21) Appl. No.: 13/028,922

(22) Filed: Feb. 16, 2011

(65) Prior Publication Data

US 2012/0210138 A1    Aug. 16, 2012

(51) Int. Cl.
*G06F 12/14* (2006.01)
*G06F 1/26* (2006.01)
*G06F 21/55* (2013.01)

(52) U.S. Cl.
CPC .............. *G06F 1/263* (2013.01); *G06F 21/558* (2013.01)

(58) Field of Classification Search
CPC . G06F 21/558; G06F 1/263; G06K 19/07363; G06K 19/073
See application file for complete search history.

(56) References Cited

U.S. PATENT DOCUMENTS

| | | | |
|---|---|---|---|
| 6,320,770 B1 | 11/2001 | Feuser | |
| 6,507,913 B1 * | 1/2003 | Shamir | 713/300 |
| 6,654,884 B2 | 11/2003 | Jaffe et al. | |
| 6,748,535 B1 * | 6/2004 | Ryan et al. | 713/189 |
| 6,766,455 B1 | 7/2004 | Ryan, Jr. | |
| 7,375,502 B2 | 5/2008 | Malherbe et al. | |
| 7,395,439 B2 | 7/2008 | Elbe et al. | |
| 7,620,823 B2 * | 11/2009 | Kim | 713/194 |
| 7,692,449 B2 | 4/2010 | Verbauwhede et al. | |
| 2004/0158728 A1 * | 8/2004 | Kim | 713/194 |
| 2010/0169671 A1 | 7/2010 | Coussieu et al. | |

OTHER PUBLICATIONS

Daniel J. MacDonald, "A Balanced-Power Domino-Style Standard Cell Library for Fine-Grain Asynchronous Pipelined Design to Resist Differential Power Analysis Attacks," Thesis from Boston University College of Engineering, 144 pages, 2005.

* cited by examiner

*Primary Examiner* — Jeffrey Pwu
*Assistant Examiner* — Nega Woldemariam
(74) *Attorney, Agent, or Firm* — Shumaker & Sieffert, P.A.

(57) ABSTRACT

This disclosure describes techniques that may prevent cryptographic devices, including both encryption devices and decryption devices, from producing a power signature that can be used by attackers to deconstruct a cryptographic algorithm and extract a cryptographic key. The techniques may include an external power supply charging an internal, dedicated power storage element; temporarily gating off the encryption device from the external power supply; configuring a cryptographic logic unit to perform a cryptographic algorithm from power stored in the power storage element while the external power source is gated off; and then recharging the power storage element upon the cryptographic logic unit completing an iteration of the cryptographic algorithm.

15 Claims, 7 Drawing Sheets

CRYPTOGRAPHIC LOGIC CIRCUIT WITH RESISTANCE TO DIFFERENTIAL POWER ANALYSIS

TECHNICAL FIELD

This disclosure relates to cryptographic communication techniques.

BACKGROUND

The field of cryptography is generally dedicated to mathematical routines and processes for transforming unencrypted information referred to as "plain text" into encrypted information referred to as "cipher text." Plain text information is generally in a form, such as plain text English, that is intelligible. Cipher text information, in contrast, is generally in a form that is not intelligible. For example, an encrypting algorithm might transform the plain text of "Clearwater, Fla." into cipher text that reads "h4k0f2145n:0}1we9?b[6g." A decrypting algorithm reverses the encryption operation by taking unintelligible data and making it intelligible again. Both encryption and decryption operations rely on the use of what is commonly referred to as a "cryptographic key." The cryptographic key is a value that is unique to authorized users and is accepted as input to the cryptographic algorithm for the purpose of making the transformation unique. In general, the intent is that cipher text cannot be recovered without the appropriate cryptographic key. For example the cryptographic algorithm can transform the cipher text of "h4k0f2145n:0}1we9?b[6g" back into the plain text of "Clearwater, Fla.," only if the cryptographic key used to encrypt the message is available to decrypt the message. As the cryptographic key grants access to the secured plain text when it is in encrypted form, the cryptographic key must itself be kept secret.

In a typical cryptographic system, a trusted user with an encrypting device and a key might encrypt confidential information and transmit the encrypted confidential information to another trusted user who possesses a device with a key. In many applications, an objective of cryptography is to make secret and/or confidential information unintelligible to unauthorized users. For example, even should an unauthorized user gain access to the cipher text of "h4k0f2145n:0}1we9?b[6g," without the key, this encrypted information would be unintelligible and unusable to the unauthorized user.

Oftentimes unauthorized users will attempt to analyze cipher text in an attempt to extract the cryptographic key. Such unauthorized users are sometimes referred to as "attackers," and such attempts to extract cryptographic keys are sometimes referred to as "attacks." One technique for extracting the key is commonly referred to as the "brute force" technique, which involves an attempt to match every possible combination of plain text to the cipher text until a match is found. In modern 128-bit and 256-bit encryption, a pure brute force attack is highly impractical, even with the processing power of modern computers.

Differential power analysis (DPA) is a powerful cryptanalytic technique that can be used by attackers to extract cryptographic keys from cryptographic hardware by statistically correlating power consumption measurements recorded during processing of a cryptographic algorithm to specific operations of the cryptographic algorithm. By isolating the specific intermediate operations that comprise the cryptographic algorithm, attackers can gain an understanding of how a cryptographic algorithm is operating, and based on this understanding, the attackers can deconstruct the cryptographic algorithm incrementally until a key can be successfully extracted. In some instances, even 128-bit and 256-bit keys are vulnerable to deconstruction via DPA.

SUMMARY

In general, this disclosure describes techniques that may prevent cryptographic devices, including both encryption devices and decryption devices, from producing a power signature that can be used by attackers to deconstruct a cryptographic algorithm. These techniques may be effective countermeasures to cryptanalytic attacks. The techniques may include an external power supply charging an internal, dedicated power storage element; temporarily gating off the encryption device from the external power supply; configuring a cryptographic logic unit to perform a cryptographic algorithm from power stored in the power storage element while the external power source is gated off; and then recharging the power storage element upon the cryptographic logic unit completing an iteration of the cryptographic algorithm. By isolating a power supply observable by an attacker from the cryptographic process, in such a manner, the power signature observable by an attacker may consist only of a spike during the recharging operation with little or no correlation to intermediate steps of the cryptographic algorithm being performed by the cryptographic logic unit. Such a power signature may provide information such as average power consumed for a cryptographic operation, but average power consumption generally does not provide the insight into specific individual operations required for successful DPA. Thus, the power signature may not allow an attacker to deconstruct the cryptographic algorithm into intermediate data points.

In one example, this disclosure describes a cryptographic device. The cryptographic device comprises a cryptographic logic unit; a power storage element configured to be charged by an external power source; and, switching logic configured to disconnect the power storage element from the external power source during operation of the cryptographic logic unit.

In another example this disclosure describes a cryptographic device. The cryptographic device comprises a cryptographic logic unit; a first power storage element configured to be charged by an external power source; a second power storage element configured to be charged by the external power source; switching logic configured to disconnect the first power storage element from the external power source and to disconnect the second power storage element from the external power source; and, timing logic configured to cause the first power storage element to deliver power to the cryptographic logic unit while disconnected from the external power source, and to cause the second power storage element to deliver power to the cryptographic logic unit while disconnected from the external power source.

In another example, this disclosure describes a method of operating a cryptographic device. The method comprises charging a power storage element by an by an external power source; disconnecting the power storage element from the external power source; and, performing a portion of a cryptographic algorithm while the power storage element is disconnected from the external power source.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
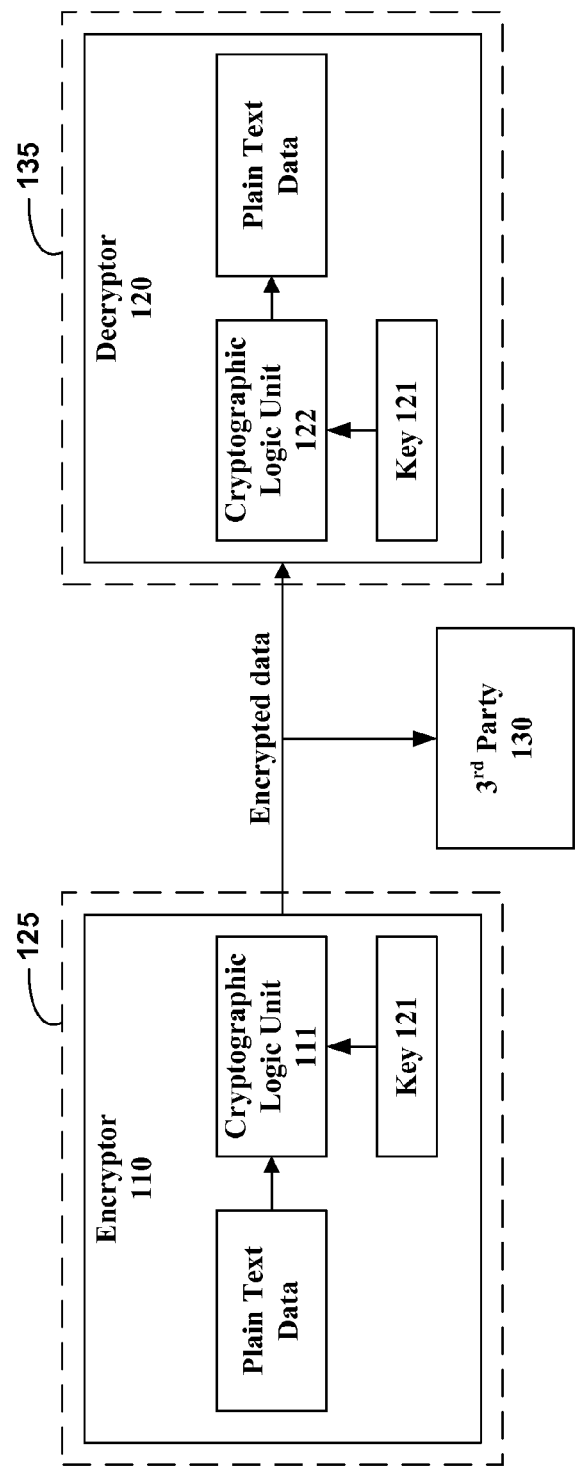
FIG. 1 is a block diagram illustrating a cryptographic system configured to implement aspects of the present disclosure.

FIG. 1 is a block diagram illustrating a system configured to implement various techniques of this disclosure. An encrypting device 110 (also referred to as encryptor 110) with a cryptographic logic unit 111 receives plain text. The cryptographic logic unit 111 performs a cryptographic algorithm, utilizing key 121, to transform the plain text into cipher text. Encryptor 110 transmits the cipher text over a wired or wireless communication medium to decryptor 120. Decryptor 120 also includes a cryptographic logic unit 122 that utilizes key 121 for transforming the cipher text back into plain text. Cryptographic logic unit 122, like cryptographic logic unit 111, may comprise a logic unit configured to perform a cryptographic algorithm. Cryptographic logic unit 122 in decryptor 120 may be specifically correlated to cryptographic logic unit 111 in such a way that cryptographic logic unit 122 with key 121 performs a decrypting algorithm that is generally the inverse of the encrypting algorithm performed by cryptographic logic unit 111 with key 121. Thus, in the example system of FIG. 1, encryptor 110 can receive plain text of "Clearwater, Fla.," and cryptographic logic unit 111, using key 121, can transform the plain text into the cipher text of "h4k0f2145n:0}1we9?b[6g." Decryptor 120 receives the cipher text of "h4k0f2145n:0}1we9?b[6g," and cryptographic logic unit 122, using key 121, transforms the cipher text back into plain text of "Clearwater, Fla."

In some instance, a third party 130 may also receive the cipher text "h4k0f2145n:0}1we9?b[6g," but without key 121, third party 130 will not be able to transform the cipher text back into the plain text of "Clearwater, Fla." According to the techniques of this disclosure, encryptor 110 and decryptor 120 can be made more resistant to cryptanalytic techniques such as DPA. Although aspects of the present disclosure may be described with respect to encrypting devices with cryptographic logic units and keys, such as encryptor 110 and cryptographic logic unit 111, it should be understood that the techniques of the present disclosure may also be applicable to decrypting devices with cryptographic logic units and keys, such as decryptor 120 and key 121. In some implementation, devices may be configured to perform both encrypting and decrypting.

Encryptors and decryptors, such as encryptor 110 and decryptor 120, when implemented in hardware, often utilize semiconductor technology that includes transistors. Encryptor 110 and decryptor 120 may each include cryptographic boundaries (125 and 135 respectively) that serve as physical barriers to preventing attackers from accessing and analyzing individual components within encryptor 110 and decryptror 120. Not all components, however, can be protected by a cryptographic boundary. In particular, cryptographic devices typically require an externally accessible contact point for connection to an external power source. When executing a cryptographic algorithm, the states of the transistors switch on an operation by operation basis (e.g., clock cycle by clock cycle), which manifests itself as a "power signature" corresponding to how much power is being drawn at that contact point from a power source at any given moment. As the cryptographic algorithm is repeated, a pattern (i.e. the power signature) emerges. From the power signature, an attacker can determine how many steps are in a particular cryptographic algorithm and begin to isolate what is occurring at individual steps. By isolating individual steps of a cryptographic algorithm in this manner, the cryptographic algorithm can be deconstructed until the cryptographic key can eventually be extracted.

The present disclosure includes techniques that may prevent encryptor 110 and decryptor 120 from producing a power signature that can be utilized in this manner. As will be discussed in more detail below, the techniques of this disclosure include a countermeasure to DPA that involves an external power supply charging an internal, dedicated power storage element; temporarily gating off encryptor 110 from the external power supply; cryptographic logic unit 111 executing an iteration of the cryptographic algorithm from power stored in the power storage element; and then recharging the power storage element upon cryptographic logic unit 111 completing the iteration of the cryptographic algorithm. By isolating a power supply observable by an attacker from the cryptographic process, in such a manner, the power signature observable by an attacker may consist only of a spike during the recharging operation which may have no correlation to intermediate steps of the cryptographic algorithm being performed by cryptographic logic unit 111. Such a power signature for encryptor 110 may not provide insight into the specific individual operations required for a successful DPA, and instead, may only provide an average power consumption measurement.

Some techniques for preventing DPA on cryptographic hardware devices, such as introducing noise unrelated to data processing into the circuitry to mask critical operations and including balancing circuitry to reduce variation in how much power the device draws over an iteration of the cryptographic algorithm, often require introducing substantial additional logic into a circuit and thus also require additional power utilization. Techniques of this disclosure, in contrast, may achieve the desired security objectives with only minimal additional logic, which may result in reduced design time and reduced power consumption.

Figure 2:
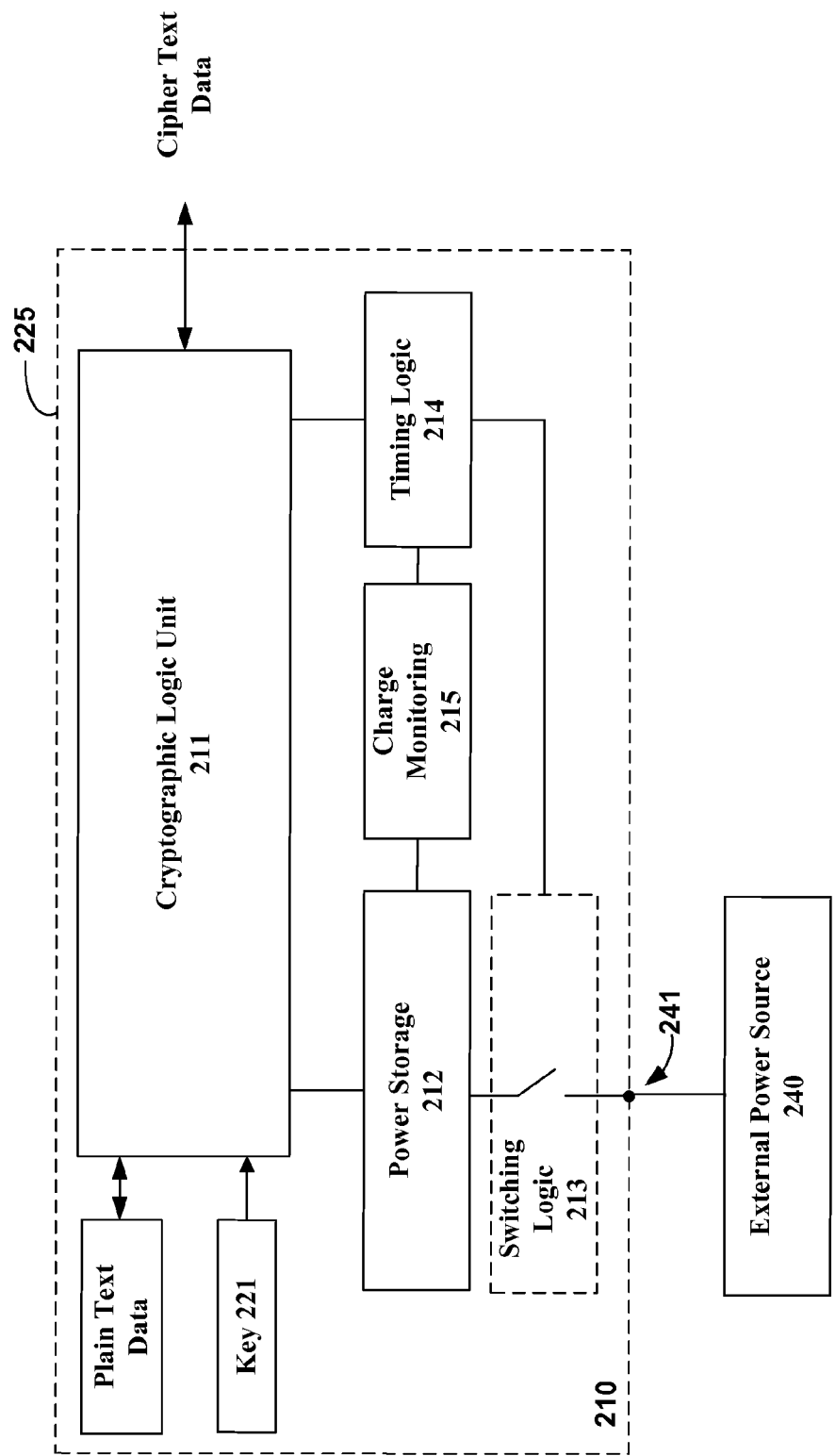
FIG. 2 is a block diagram illustrating an encryption device configured to implement aspects of the present disclosure.

FIG. 2 is a block diagram illustrating a cryptographic device configured to implement aspects of the present disclosure. Cryptographic device 210 includes a cryptographic logic unit 211, a power storage element 212, switching logic 213, key 221, timing logic 214, and a charge monitoring unit 215. Switching logic 213, timing logic 214, and charge monitoring unit 215 are shown separately in FIG. 4 for illustrative purposes, but may actually be highly integrated in some implementations. Cryptographic boundary 225 establishes a physical perimeter around cryptographic logic unit 211, power storage element 212, switching logic 213, key 221, timing logic 214, charge monitoring unit 215, and other components of cryptographic device 210. Cryptographic boundary 225 can serve as a barrier to prevent a potential attacker from accessing, and potentially analyzing the function of, individual components within cryptographic device 210.

Cryptographic device 210 can be either an encryption device, decryption device, or both. Cryptographic logic unit 211 performs a cryptographic algorithm for transforming plain text into cipher text when cryptographic device 210 is operating as an encryption device, and performs an algorithm for transforming cipher text into plain text when operating as a decryption device. Key 221 is an input into the cryptographic algorithm that causes the output of the cryptographic algorithm to be unique. Values for key 221 may, for example, be implemented into logic, stored in a memory, dynamically generated, or be accessible to cryptographic logic unit 211 through other means. For simplicity, cryptographic devices in this disclosure, such as cryptographic device 210 of FIG. 2, are shown with one cryptographic logic unit and one key, but it should be understood that techniques of this disclosure can be applicable to devices that utilize multiple cryptographic logic units and/or multiple keys.

Power storage element 212 receives and stores power from external power source 240 and delivers power to cryptographic logic unit 211. Switching logic 213 connects and disconnects external power source 240 from power storage element 212. Timing logic 214 controls the timing of when cryptographic logic unit 211 performs the cryptographic algorithm and when switching logic 213 connects power storage element 212 to external power source 240. Timing logic 214 can include circuitry such as a timer, statemachine, or equivalent logic configured to synchronize blocks of cryptographic operations in cryptographic logic unit 211 to the charge and discharge cycles of power storage element 212.

Techniques of the present disclosure include utilizing timing logic 214 to cause cryptographic logic unit 211 not to perform a portion of a cryptographic algorithm when switching logic 213 connects power storage element 212 to external power source 240. When switching logic 213 connects power storage element 212 to external power source 240, then external power source 240 charges power storage element 212. During this charging, timing logic 214 can cause cryptographic logic unit 211 not to perform the cryptographic algorithm. Once storage element 212 has stored sufficient power for cryptographic logic unit 211 to perform a portion of the cryptographic algorithm, timing logic 214 can cause switching logic 213 to disconnect power storage element 212 from external power source 240. During execution of the cryptographic algorithm, cryptographic logic unit 211 draws power from power storage element 212 and not external power source 240.

While external power source 240 is disconnected, cryptographic logic unit 211 may perform a portion of the cryptographic algorithm. In some examples, the portion of the cryptographic algorithm performed while external power source 240 is disconnected may comprise one full iteration of the cryptographic algorithm or multiple iterations of the cryptographic algorithm. In other examples, the portion of the cryptographic algorithm may consist of less than a full iteration of the cryptographic algorithm. In configurations where cryptographic logic unit 211 performs less than a full iteration of the cryptographic algorithm while external power source 240 is disconnected, timing logic 214 can be configured in a manner such that the portion of the cryptographic algorithm performed while the external power source 240 is disconnected stays constant across multiple iterations of the cryptographic algorithm. For example, if a cryptographic algorithm consists of 100 discrete steps (i.e. is performed over 100 clock cycles), timing logic 214 can be configured so that the same subset of the 100 discrete steps is always performed while external power source 240 is disconnected.

For ease of explanation, this disclosure may generally refer to the period of time when external power source 240 is charging power storage element 212 as a charging cycle, and the period of time when cryptographic logic unit 211 is executing the cryptographic algorithm as a logic cycle. As will be illustrated in later examples, charging cycles and logic cycles may occur independent of one another in some implementations, but also may overlap with one another in other implementations. Timing logic 214 can be configured to synchronize logic cycles with charging cycles. In cryptographic device 210, for example, timing logic 214 may be configured to cause a charging cycle to occur only when a logic cycle is not occurring, or may cause a charging cycle to occur only during a specific portion of a logic cycle.

Charge monitoring unit 215 can determine an amount of charge stored by power storage element 212 by, for example, measuring a voltage drop or current across power storage element 212. In some implementations, the duration of a charging cycle may be based on an amount of charge measured by charge monitoring unit 215. For example, a charge cycle may last only as long as is needed for storing a specific amount of charge in power storage element 212, and once that level of charge is detected by charge monitoring unit 215, timing logic 214 can cause switching logic 213 to disconnect power storage element 212 from external power source 240. In another example, charge monitoring unit 215 can monitor the charge of power storage element 212 on an on-going basis instead of a cycle-by-cycle basis and systematically increase or decrease the duration of future charging cycles based on whether or not previous charging cycles provided an excess amount of charge or an insufficient amount of charge to power storage element 212. In other implementations, charge monitoring unit 215 may be excluded from cryptographic device 210, and the duration of a charging cycle can be based on a fixed interval of time. For example, power storage element 212 may be connected to external power source 240 for a specific number of seconds before timing logic 214 causes switching logic 213 to disconnect power storage element 212 from external power source 240.

Connection point 241 on FIG. 2 represents a physical connection between cryptographic device 210 and external power source 240. Unlike other components of cryptographic device 210 that are contained within cryptographic boundary 225, connection point 241 might be accessible to a potential attacker. In one example, cryptographic device 210 may be implemented on an integrated circuit (IC), and connection point 241 may represent a pin on the integrated circuit that receives power from a battery, an AC power supply, a DC power supply, a transformer, a power storage unit on a printed circuit board, or another power source external to the IC. In other examples, cryptographic device 210 may be implemented on a printed circuit board with one or multiple ICs, and connection point 241 may be a pin on the printed circuit board. Cryptographic device 210 may also be implemented into a variety of other types of electronics packages, including but not limited to multi-chip modules and multi-card assemblies. Typically, an attacker attempting to perform DPA on cryptographic device 210 would measure the power being drawn from external power source 240 at connection point 241 as cryptographic logic unit 211 performs the cryptographic algorithm.

Figure 3A:
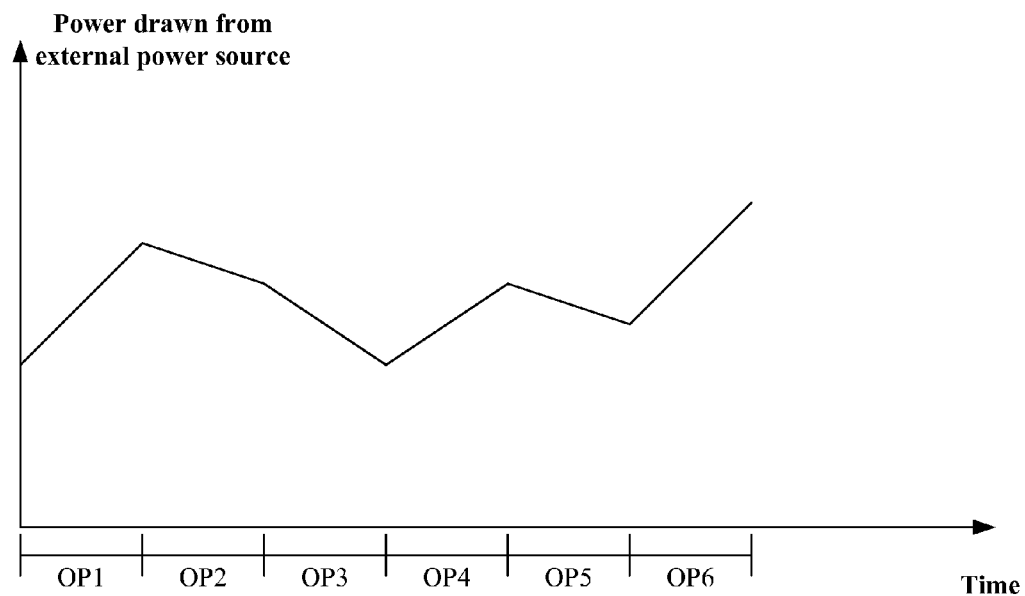
FIG. 3A shows a graph of power drawn versus time for a prior art cryptographic device.

FIG. 3A is a graph illustrating power drawn from an external power supply during a logic cycle versus time. In the example of FIG. 3A, one complete logic cycle (i.e. one full iteration of the cryptographic algorithm) has six operations (OP1-OP6). At each of OPs 1-6 a different amount of power is drawn from an external source. Over several iterations of the cryptographic algorithm, the pattern shown in FIG. 3A will repeat, allowing a potential attacker to determine that the cryptographic algorithm consists of six operations and also allowing a potential attacker to begin to dissect what happens at each operation.

Figure 3B:
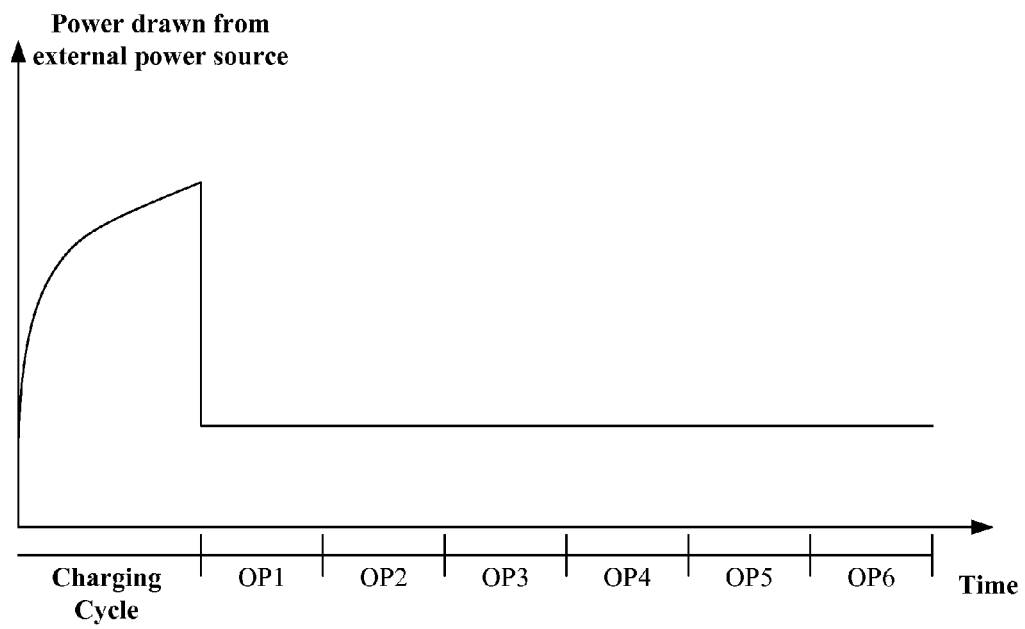
FIG. 3B shows a graph of a cryptographic device implementing techniques of the present disclosure.

FIG. 3B is a graph illustrating power drawn from external power source 240 versus time for a logic cycle of cryptographic device 210, when implementing techniques of this disclosure. The graph of FIG. 3B would be determined based on a power measurement taken at connection point 241. During a charging cycle, cryptographic device 210 draws power from external power source 240. During a logic cycle (OPs 1-6), however, switching logic 213 disconnects power storage element 212 from external power source 240, and cryptographic logic unit 211 draws power from power storage element 212. Thus, an attacker attempting to perform DPA at connection point 241 will not see any power drawn from external power source 240 during execution of the cryptographic algorithm. Unlike the power signature produced in FIG. 3A, the power signature shown in FIG. 3B does not show power drawn on an operation by operation basis, but instead only shows a total power drawn for all of OPs 1-6. Producing a power signature, such as the one shown in the example of FIG. 3B, may make an encrypting device more resistant to DPA than producing a power signature such as the one shown in FIG. 3A. It should be apparent that the graphs of FIGS. 3A and 3B have been simplified for illustrative purposes.

Figure 4:
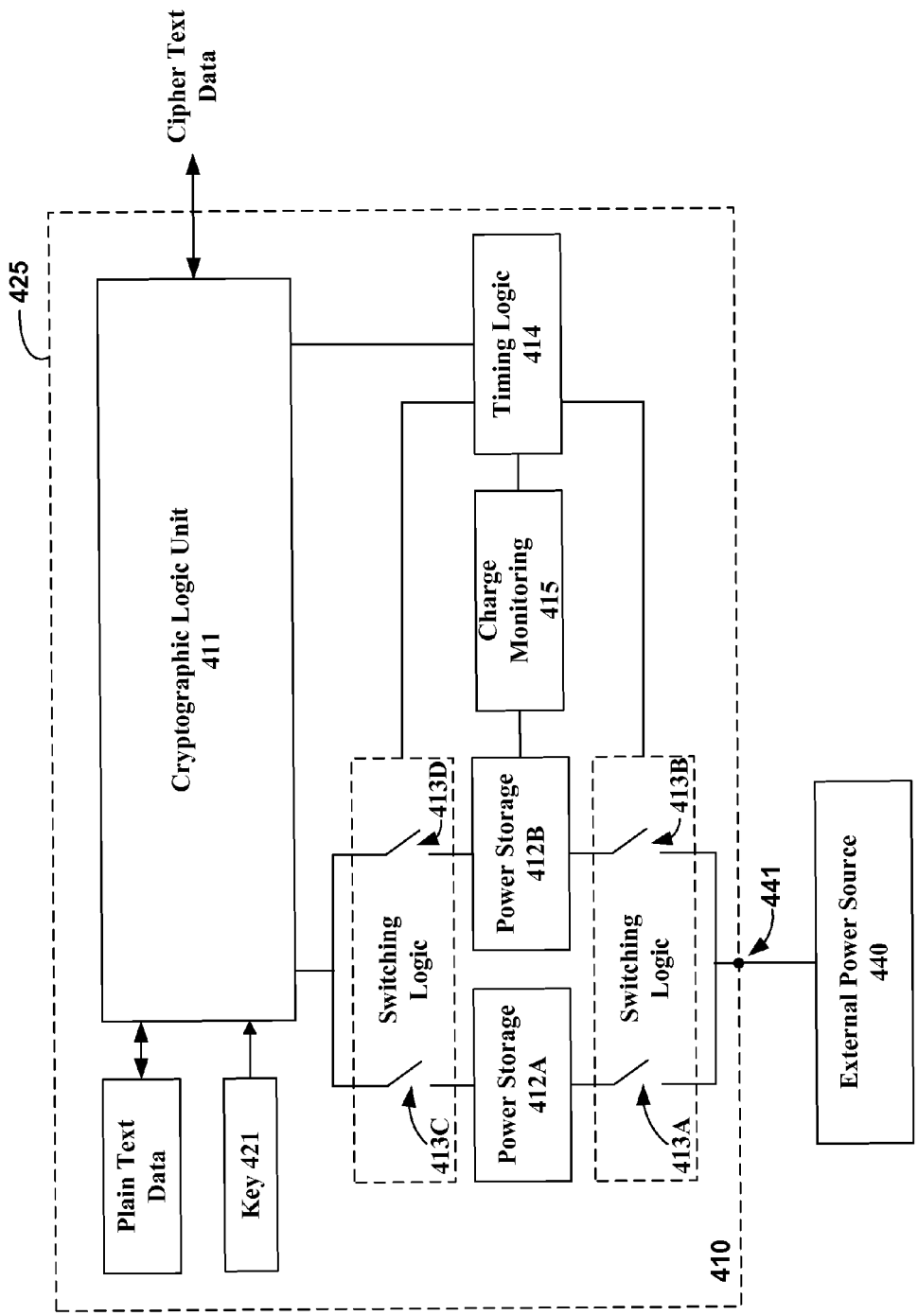
FIG. 4 is a block diagram illustrating an encryption device configured to implement aspects of the present disclosure.

FIG. 4 is a block diagram illustrating a cryptographic device configured to implement aspects of the present disclosure. Cryptographic device 410 is similar to cryptographic device 210, but instead of having one power storage element, cryptographic device 410 includes two power storage elements, shown in FIG. 4 as power storage elements 412A and 412B. Cryptographic device 410 includes a cryptographic logic unit 411, key 421, power storage elements 412A and 412B, switching logic 413A-D, timing logic 414, and charge monitoring unit 415. Cryptographic logic unit 411 performs a cryptographic algorithm for transforming plain text into cipher text. Although FIG. 4 provides an example of a cryptographic device with two power storage elements, it is contemplated that the techniques of this disclosure described in relation to FIG. 4, can be extended to cryptographic devices with more than two power storage elements. Cryptographic boundary 425 establishes a physical perimeter around cryptographic logic unit 411, power storage elements 412A-B, switching logic 413A-D, key 421, timing logic 414, charge monitoring unit 415, and other components of cryptographic device 410. Cryptographic boundary 425 can serve as a barrier to prevent a potential attacker from accessing, and potentially analyzing the function of, individual components within cryptographic device 410.

Cryptographic device 410 can be either an encryption device, decryption device, or both. Cryptographic logic unit 411 performs a cryptographic algorithm for transforming plain text into cipher text when cryptographic device 410 is operating as an encryption device, and performs an algorithm for transforming cipher text into plain text when operating as a decryption device. Key 421 is an input into the cryptographic algorithm that causes the output of the cryptographic algorithm to be unique. Values for key 421 may, for example, be implemented into logic, stored in a memory, dynamically generated, or be accessible to cryptographic logic unit 411 through other means.

Power storage elements 412A and 412B receive and store power from external power source 440 and deliver power to cryptographic logic unit 411. Switching logic 413A-B connects and disconnects external power source 440 from power storage elements 412A and 412B, and switching logic 413C-D connects and disconnects power storage elements 412A and 412B from cryptographic logic unit 411. Timing logic 414 controls the timing of when switching logic 413A-B connects power storage elements 412A and 412B to external power source 240 and when switching logic 413C-D connects power storage elements 412A and 412B to cryptographic logic unit 411. Switching logic 413A-B, switching logic 413C-D, and timing logic 414, as well as other portions of cryptographic device 410 are shown separately in FIG. 4 for illustrative purposes, but may be highly integrated in some implementations.

Aspects of the present disclosure include timing logic 414 causing power storage element 412A to deliver power to cryptographic logic unit 411 while power storage element 412B charges, and power storage element 412B to deliver power to cryptographic logic unit 411 while power storage element 412A charges. Timing logic 414 can be configured to cause switching logic 413C to disconnect power storage element 412A from cryptographic logic unit 411 while switching logic 413A connects power storage element 412A to external power source 440. Timing logic 414 can be further configured to cause switching logic 413D to disconnect power storage element 412B from cryptographic logic unit 411 while switching logic 413B connects power storage element 412B to external power source 440.

Similar to charge monitoring unit 215 described above in reference to FIG. 2, charge monitoring unit 415 can determine an amount of charge stored by power storage element 412B by, for example, measuring a voltage drop or current across power storage element 412B. In some implementations, the duration of a charging cycle may be based on an amount of charge measured by charge monitoring unit 415. For example, a charge cycle may last only as long as is needed for storing a specific amount of charge in one of power storage element 412B, and once that level of charge is detected by charge monitoring unit 415, timing logic 414 can cause one of switching logic 413B to disconnect power storage element 412B from external power source 440. In another example, charge monitoring unit 415 can monitor the charge of power storage element 412B on an on-going basis instead of a cycle-by-cycle basis and systematically increase or decrease the duration of future charging cycles based on whether or not previous charge cycles provided an excess amount of charge or an insufficient amount of charge to power storage element 412B. In other implementations, charge monitoring unit 415 may be excluded from cryptographic device 410, and the duration of a charging cycle can be based on a fixed interval of time. For example, power storage element 412B may be connected to external power source 440 for a specific number of seconds before timing logic 414 causes switching logic 413B to disconnect power storage element 412B from external power source 440. For simplicity of explanation, FIG. 4 and the above description show charge monitoring unit 415 as monitoring power storage element 412B, but it is contemplated that charge monitoring unit 415 could similarly monitor power storage element 412A, both power storage elements 412A and 412B, or any combination of power storage elements contained within cryptographic device 410, including more than two power storage elements.

Connection point 441 on FIG. 4 represents a physical connection between cryptographic device 410 and external power source 440. Unlike other components of cryptographic device 410 that are contained within cryptographic boundary 425, connection point 441 might be accessible to a potential attacker. In one example, cryptographic device 410 may be implemented on an integrated circuit (IC), and connection point 441 may represent a pin on the integrated circuit that receives power from a battery, an AC power supply, a DC power supply, a transformer, a power storage unit on a printed circuit board, or another power source external to the IC. In other examples, cryptographic device 410 may be implemented on a printed circuit board with one or multiple ICs, and connection point 441 may be a pin on the printed circuit board. Typically, an attacker attempting to perform DPA on cryptographic device 410 would measure the power being drawn from external power source 440 at connection point 441 as cryptographic logic unit 411 performs the cryptographic algorithm.

Figure 5A:
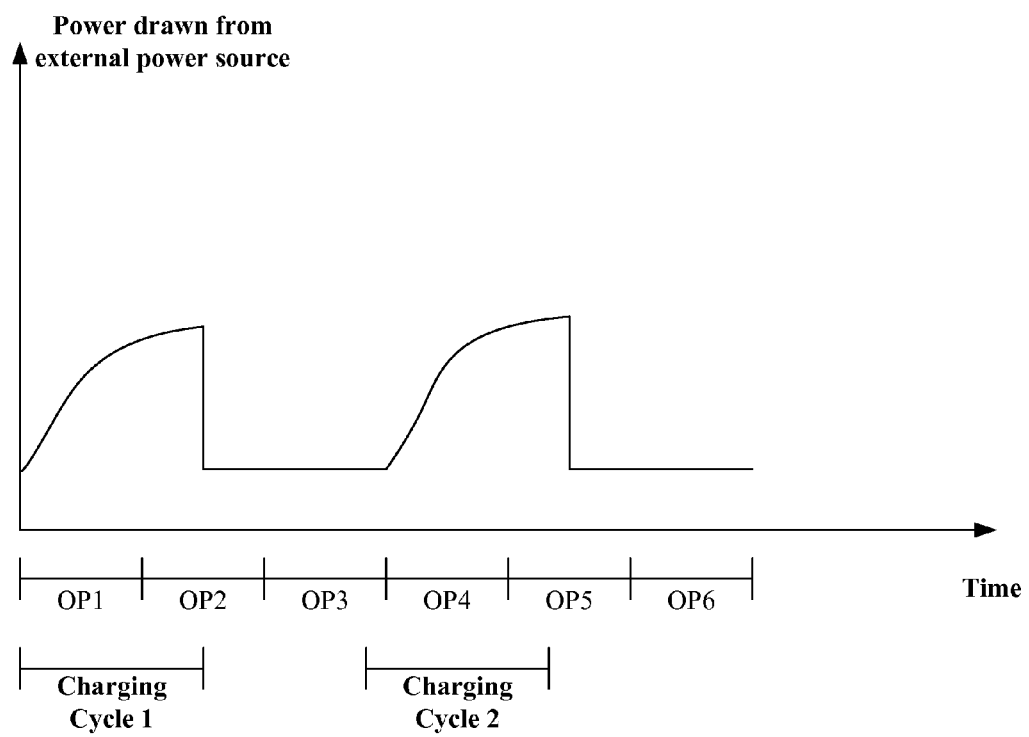
FIGS. 5A and 5B show graphs of power drawn versus time for two operational configurations of a cryptographic device that implements techniques of the present disclosure.

FIG. 5A is a graph illustrating power drawn from external power source 440 versus time for a logic cycle of cryptographic device 410, when implementing techniques of this disclosure. The graph of FIG. 5 may be determined based on a power measurement taken at connection point 441. As can be seen from the graph in the example of FIG. 5A, the charging cycles (i.e. charging cycle 1 and charging cycle 2) overlap with the logic cycle (i.e. OPs 1-6). Charging cycle 1, might for example, be external power source 440 charging power storage element 412A. During charging cycle 1, power storage element 412B can deliver power to cryptographic logic unit 411 to perform Ops 1-3. During charging cycle 2, external power source 440 can charge power storage element 412B, while power storage element 412A provides power to cryptographic logic unit 411.

Figure 5B:
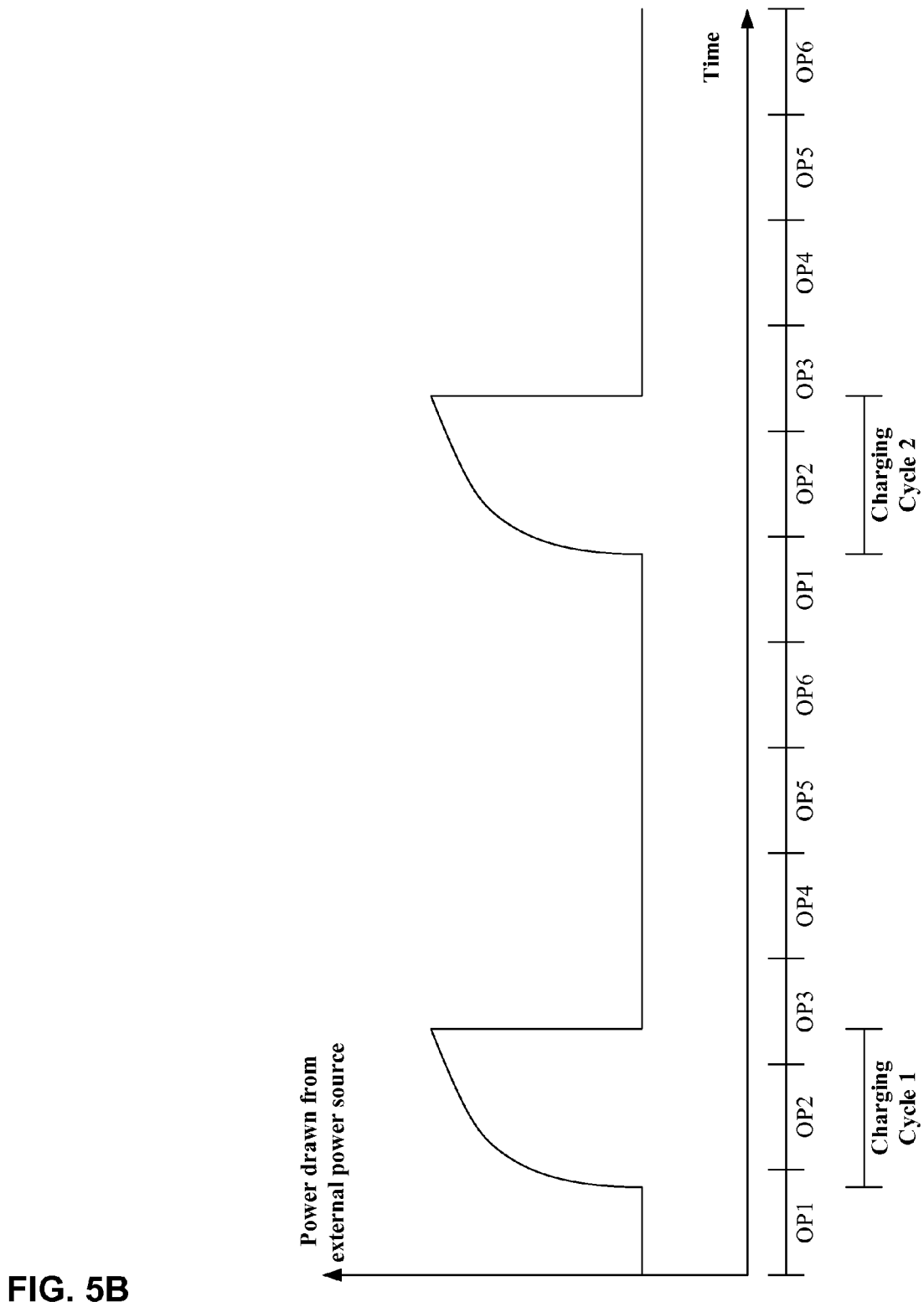

FIG. 5B is a graph illustrating power drawn from external power source 440 versus time for two logic cycles of cryptographic device 410, when implementing techniques of this disclosure. The graph of FIG. 5B may be determined based on a power measurement taken at connection point 441. As can be seen from the graph in the example of FIG. 5B, one charging cycle (i.e. charging cycle 1 or charging cycle 2) overlaps with one logic cycle (i.e. OPs 1-6). Charging cycle 1, might for example, be external power source 440 charging power storage 412A. During charging cycle 1, power storage element 412B can deliver power to cryptographic logic unit 411 to perform the first iteration of OPs 1-6. During charging cycle 2, external power source 440 can charge power storage element 412B, while power storage element 412A provides power to cryptographic logic unit 411 to perform a second iteration of OPs 1-6. The graph of FIG. 5B shows an alternative operational configuration to FIG. 5A and represents just one of many potential configurations.

As with FIG. 3B, the power signatures shown FIGS. 5A and 5B do not show power drawn on an operation by operation basis, but instead only show a total power drawn for all of OPs 1-6. Producing power signatures, such as the ones shown in the examples of FIGS. 5A and 5B, may make an encrypting device more resistant to DPA than producing a power signature such as the one shown in FIG. 3A, for example.

Power storage elements 213, 413A, and 413B can be capacitive storage elements, semiconductor-based storage elements, or other types of solid state storage elements. Power storage elements 213, 413A, and 413B, however, are not limited to being solid state power storage elements. For example, power storage elements 213, 413A, and 413B may also be electrochemical cells. Depending on implementation, power storage element 213 and 413A-B may be configured to provide a constant voltage or a decaying voltage to cryptographic logic units 211 and 411. In a constant voltage configuration, power storage element 213 and 413A-B can be configured to store a charge up to 10V, for example, during a charging cycle, and then using known DC to DC conversion techniques such as the use of charge pumps, provide a constant 5V output to cryptographic logic units 211 and 411 during a logic cycle. In a decaying voltage configuration, power storage element 213, 413A-B can be configured to store a charge of 5V, for example, during a charging cycle, and then decay to 1.2V during the logic cycle. In the decaying voltage configuration, the logic elements of cryptographic logic units 211 and 411 can be selected to operate across the voltage range supplied by power storage element 211 and 411 during the logic cycle.

Figure 6:
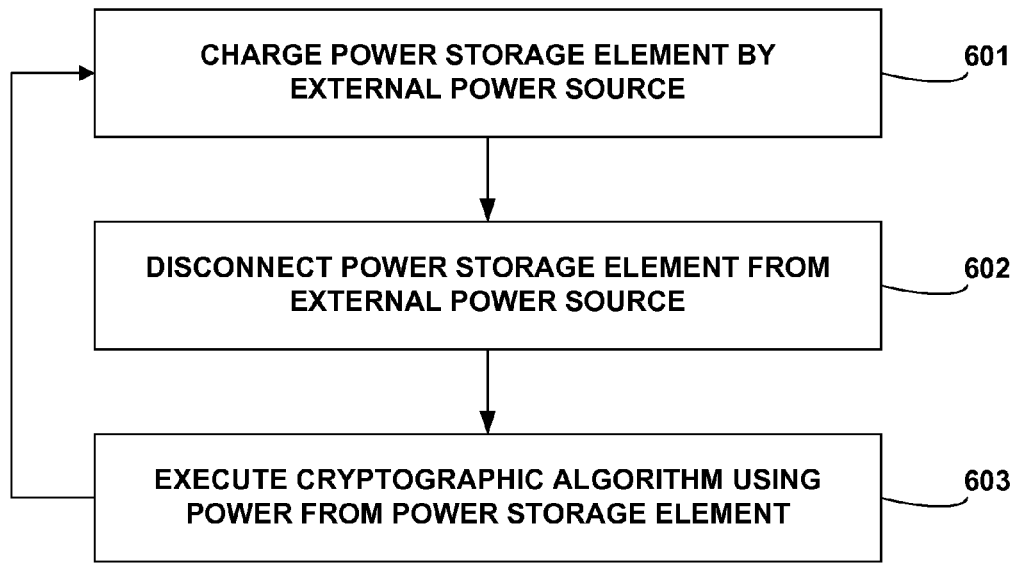
FIG. 6 shows a method implementing techniques of the present disclosure.

FIG. 6 is a flowchart illustrating a method consistent with this disclosure. The method of FIG. 6 may be performed by the devices shown in FIGS. 1, 2 and 4 and will be described, for purposes of explanation, in relation to cryptographic device 210 of FIG. 2. External power source 240 charges power storage element 212 (block 601). After power storage element 212 has stored enough charge to power cryptographic logic unit 211, timing logic 214 causes switching logic 213 to disconnect power storage element 212 from external power source 240 (block 602). While power storage element 212 is disconnected from external power source 240, power storage element 212 delivers power to cryptographic logic unit 211 while cryptographic logic unit 211 performs a cryptographic algorithm (block 603). Upon completion of the cryptographic algorithm, the method of FIG. 6 can be repeated.

The techniques of this disclosure may be realized in a wide variety of devices or apparatuses, including wireless handsets, an integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. Any features described as units, modules, or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials.

The computer-readable medium may comprise a tangible computer readable storage medium, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The instructions stored in the computer readable storage medium may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encrypting and decrypting, or incorporated in a combined encryption-decryption device. Also, the techniques could be fully implemented in one or more circuits or logic elements.

Various embodiments of the invention have been described. These and other embodiments are within the scope of the following claims.

The invention claimed is:

1. A cryptographic device comprising:
   a cryptographic logic unit;
   a power storage element configured to be charged by an external power source;
   first switching logic configured to disconnect the power storage element from the cryptographic logic unit;
   second switching logic configured to disconnect the power storage element from the external power source during operation of the cryptographic logic unit; and
   timing logic configured to synchronize a logic cycle of the cryptographic logic unit with a charge cycle of the power storage element, wherein a first portion of a cryptographic algorithm performed while the power storage element is disconnected from the external power source stays constant across multiple iterations of the cryptographic algorithm, and wherein a second portion of the cryptographic algorithm is performed while the power storage element is connected to the external power source.

2. The cryptographic device of claim 1, wherein the power storage element is a solid state storage element.

3. The cryptographic device of claim 1, wherein the timing logic is further configured to cause the cryptographic logic unit to perform a portion of the cryptographic algorithm only when the power storage element is disconnected from the external power source.

4. The cryptographic device of claim 3, wherein the timing logic is further configured to cause the cryptographic logic unit not to perform a different portion of the cryptographic algorithm when the power storage element is connected to the external power source.

5. The cryptographic device of claim 1, further comprising:
   a charge monitoring unit configured to measure an amount of charge stored by the power storage element: and,
   wherein the timing logic is configured to adjust a duration of the charge cycle based on a measurement of charge determined by the charging monitor.

6. The cryptographic device of claim 1, wherein the cryptographic logic unit is configured to perform at least one of an encryption algorithm and a decryption algorithm.

7. The cryptographic device of claim 1, further comprising:
   a second power storage element configured to be charged by the external power source;
   wherein the first switching logic is further configured to disconnect the second power storage element from the cryptographic logic unit while the power storage element is connected to the cryptographic logic unit and connect the second power storage element to the cryptographic logic unit while the power storage element is disconnected from the cryptographic logic unit; and,
   wherein the second switching logic is further configured to disconnect the second power storage element from the external power source while the power storage element is connected to the external power source and connect the second power storage element to the external power source while the power storage element is disconnected from the external power source.

8. A method of operating a cryptographic device, the method comprising:
   disconnecting a power storage element from a cryptographic logic unit;
   while the power storage element is disconnected from the cryptographic logic unit, charging the power storage element by an external power source;
   disconnecting the power storage element from the external power source;
   performing, a first portion of a cryptographic algorithm while the power storage element is disconnected from the external power source;
   synchronizing performance of the first portion of the cryptographic algorithm with a charge cycle of the power storage element, wherein the first portion of the cryptographic algorithm performed while the power storage element is disconnected from the external power source stays constant across multiple iterations of the cryptographic algorithm;
   performing, a second portion of the cryptographic algorithm while the power storage element is connected to the external power source.

9. The method of claim 8, wherein the power storage element is a solid state storage element.

10. The method of claim 8, further comprising:
    executing a portion of the cryptographic algorithm only when the power storage element is disconnected from the external power source.

11. The method of claim 8, further comprising:
    not executing a portion of the cryptographic algorithm when the power storage element is connected to the external power source.

12. The method of claim 11, further comprising:
    synchronizing the charging of the power storage element with the performing of the portion of the cryptographic algorithm.

13. The method of claim 8, wherein the cryptographic algorithm is an encryption algorithm.

14. The method of claim 8, wherein the cryptographic algorithm is a decryption algorithm.

15. The method of claim 8, further comprising:
    while the power storage element is disconnected from the external power source, charging a second external power source by the external power source; and
    connecting the second external power source to the cryptographic logic unit; and
    performing, by the cryptographic logic unit, the second portion of the cryptographic algorithm while the second power storage element is connected to the cryptographic logic unit.

* * * * *